United States Patent [19]
Jensen et al.

[11] Patent Number: 5,932,500
[45] Date of Patent: Aug. 3, 1999

[54] MAN-MADE VITREOUS FIBRES

[75] Inventors: Soren Lund Jensen, Kobenhavn K; Vermund Rust Christensen, Roskilde; Marianne Guldberg, Soborg, all of Denmark

[73] Assignee: Rockwool International A/S, Denmark

[21] Appl. No.: 08/836,516

[22] PCT Filed: Nov. 8, 1995

[86] PCT No.: PCT/EP95/04394

§ 371 Date: May 8, 1997

§ 102(e) Date: May 8, 1997

[87] PCT Pub. No.: WO96/14274

PCT Pub. Date: May 17, 1996

[30] Foreign Application Priority Data

| Nov. 8, 1994 | [GB] | United Kingdom | 9422468 |
| Nov. 23, 1994 | [GB] | United Kingdom | 9424126 |
| Nov. 23, 1994 | [GB] | United Kingdom | 9424127 |
| Jan. 13, 1995 | [GB] | United Kingdom | 9500667 |

[51] Int. Cl.$^6$ .................................................. C03C 13/06
[52] U.S. Cl. ................................ 501/36; 501/38; 501/70; 501/73
[58] Field of Search ................................ 501/35, 36, 38, 501/70, 73

[56] References Cited

U.S. PATENT DOCUMENTS

| 2,020,403 | 11/1935 | Engle | 501/35 |
| 2,576,312 | 11/1951 | Minnick | 501/36 |
| 3,736,162 | 5/1973 | Chvalovsky et al. | 501/35 |
| 4,002,482 | 1/1977 | Coenen | 501/72 |
| 4,205,992 | 6/1980 | Morgensen et al. | 501/36 |
| 4,363,878 | 12/1982 | Yamamoto et al. | 501/28 |
| 4,461,840 | 7/1984 | Massol et al. | 501/36 |
| 5,037,470 | 8/1991 | Matzen et al. | 501/35 |
| 5,250,488 | 10/1993 | Thelohan et al. | 501/69 |
| 5,312,806 | 5/1994 | Morgensen | 501/38 |
| 5,576,252 | 11/1996 | Rapp et al. | 501/35 |

FOREIGN PATENT DOCUMENTS

| 057397 A1 | 11/1982 | European Pat. Off. . |
| 0231691 | 8/1987 | European Pat. Off. . |
| 0459897 | 12/1991 | European Pat. Off. . |
| 0412878 | 3/1994 | European Pat. Off. . |
| 2662687 | 6/1990 | France . |
| 2662687 | 12/1991 | France . |
| 0160196 | 4/1989 | Poland . |
| 1724613 A1 | 7/1992 | Russian Federation . |
| 0197942 | 8/1965 | Sweden . |
| 2152026 | 7/1985 | United Kingdom . |
| 87/05007 | 8/1987 | WIPO . |
| 89/12032 | 12/1989 | WIPO . |
| 92/09536 | 6/1992 | WIPO . |
| 93/22251 | 11/1993 | WIPO . |
| 94/14717 | 7/1994 | WIPO . |

OTHER PUBLICATIONS

V.R. Christensen, et al., "Effect of Chemical Composition of Man–Made Vitreous Fibers on the Rate of Dissolution in Vitro at Different pHs", Environmental Health Perspectives 102(Suppl 5): 83–86 (1994) (No Month).

Sylvie Thelohan, et al., "In Vitro Dynamic Solubility Test: Influence of Various Parameters", Environmental Health Perspectives 102(Suppl 5): 91–96 (1994) (No Month).

Fiber Diameter Distributions in typical MMVG Wool Insulation Products, Vermund R. Christensen et al. American Industrial Hygien Assoc., May 1993, pp. 232–238.

*Primary Examiner*—Michael Marcheschi
*Attorney, Agent, or Firm*—Ostrolenk, Faber, Gerb & Soffen, LLP

[57] ABSTRACT

Man-made vitreous fibres have a solubility at pH 4.5 of at least 20 nm per day and a melt viscosity of 10–70 poise at 1,400° C. A composition which will provide these properties is selected for their manufacture and contains at least 10% by weight $Al_2O_3$. Novel fibres contain at least 6% by weight $Na_2O + K_2O$.

24 Claims, No Drawings

MAN-MADE VITREOUS FIBRES

This is based on PCT/EP95/04394, filed Nov. 8, 1995 pursuant to 35 U.S.C. §371.

This invention relates to man-made vitreous fibres (MMVF) which are durable in use but which can be shown to be biologically advantageous.

MMV fibres are made from vitreous melt, such as of rock, slag, glass or other mineral melts. The melt is formed by melting in a furnace a mineral composition having the desired analysis. This composition is generally formed by blending rocks or minerals to give the desired analysis. The mineral composition often has an analysis, as oxides, which includes at least 32% $SiO_2$, below 30% $Al_2O_3$ and at least 10% CaO. The elemental analyses in the specification are by weight and calculated as oxides. The iron oxide may be a mixture of FeO and $Fe_2O_3$ but is quoted herein as FeO.

Efficient and cost-effective formation of the melt in the furnace and of the fibres from the melt requires that the composition should have a suitable liquidus temperature and should have a suitable viscosity during the fibre-forming process. These requirements impose constraints on the selection of the composition that is to be melted.

Although there is no scientific evidence establishing that there is a health risk associated with the manufacture and use of MMV fibres, commercial interests have led manufacturers to provide MMV fibres that retain the required physical properties of MMV fibres (e.g., durability at elevated temperatures and under humid conditions) but which can also be alleged to be of improved biological safety.

This allegation of improved safety is usually made on the basis of an in vitro test that examines the dissolution rate or degradability of the fibres in a liquid which is intended to simulate lung liquid, such as Gamble's solution with pH 7.4 to 7.8. A consequence of enhanced dissolution rate at pH 7.5 is that the fibres will normally have reduced resistance to humidity.

Numerous patent applications have been published describing fibres that give enhanced dissolution rate in such an in vitro test, such as WO87/05007, WO89/12032, EP 412878, EP459897, WO92/09536, WO93/22251 and WO94/14717.

A characteristic of many of these patent applications, and of fibres which are alleged to have enhanced dissolution rate in such in vitro tests, is that the fibre should have reduced aluminium content. For instance, it is stated in WO87/05007 that the $Al_2O_3$ amount must be below 10%. The aluminium content of rock wool and slag wool is generally in the range 5 to 15% (measured as $Al_2O_3$ by weight) and many of these allegedly biologically suitable fibres have an aluminium content of below 4%, and often below 2%. It is known to include phosphorous in these low-$Al_2O_3$ compositions in order to increase the dissolution rate in this pH 7.5 dissolution rate test.

A problem with many of these low-$Al_2O_3$ fibres (in addition to uncertainty as to whether they do have enhanced biological suitability) is that the melt properties are not entirely satisfactory for manufacture in conventional or easily adapted melting and fibre-forming apparatus. For instance, the melt viscosity at convenient fibre-forming temperatures may be rather low. Another problem is that a high dissolution rate at pH 7.5 may tend to result in reduced durability under humid conditions which may be experienced after installation.

In addition to the in vitro tests, in vivo research testing has been conducted. For instance, Oberdörster in VDI Berichte 853, 1991, pages 17 to 37 showed that two basic mechanisms are involved in the clearance of fibres from the lungs, namely dissolution in the near-neutral lung fluid and dissolution in the acidic environment (maintained at pH 4.5 to 5) created around fibres surrounded by macrophages in the lung. It is believed macrophages promote removal of the fibres from the lung by promoting local dissolution of the surrounded fibre area leading to weakening and breaking of the fibres so as to reduce the average fibre length, thereby enabling macrophages to engulf and transport the shorter fibres out of the lung. This mechanism is illustrated in the article by Morimoto et al in Occup. Environ. Med 1994, 51, 62–67 and especially FIGS. 3 and 7 and articles by Luoto et al in Environmental Research 66 (1994) 198–207 and Staub-Reinhaltung der Luft 52 (1992) 419–423.

Traditional glass fibres and many of the MMV fibres claimed to have increased solubility in lung fluid (at pH 7.5) have a worse solubility at pH 4.5 than at pH 7.5 and so presumably attack by macrophages would not contribute significantly to the shortening and final removal of the fibres from the lung.

Existing MMV fibres formed from rock, slag and other relatively high alkaline earth mixtures can have a higher dissolution rate at pH 4.5 than pH 7.5 but tend to have a low melt viscosity. Existing fibres which are promoted as being biologically acceptable do not have a satisfactory combination of dissolution rate at pH 4.5 with melt properties. Fibres which are currently alleged to be preferred on the basis of in vitro tests tend to have low melt viscosity when they have the required low aluminium content. The low melt viscosity inevitably reduces production efficiency compared to normal production.

It would be desirable to-provide MMV fibres which can be shown to be biodegradable in the lung, have melt properties which allow for normal, high, production efficiency and which can be made from inexpensive raw materials. Preferably they have good weathering resistance when exposed to ambient humid conditions in use.

In the invention we use, as fibres having satisfactory biological solubility, fibres which have a dissolution rate measured at pH 4 to 5 of at least 20nm per day and which are formed of a composition having a melt viscosity at 1,400° C. of 10–70 poise. For instance, the dissolution rate at pH 4.5 can be at least 30 or even at least 50 nm per day or more.

The combination of the melt viscosity and the solubility at pH 4.5 means that we can use a melt which is convenient to fiberise by conventional techniques and can produce fibres which are biologically soluble at pH 4.5. It is new to formulate or select fibres according to this combination, and many such fibres have a novel composition.

In a preferred aspect of the invention, we determine the melt viscosity and the fibre dissolution rate at a pH in the range 4–5 of one or more compositions, we select a composition which has a melt viscosity at 1400° C. of 10 to 70 poise and provides fibres which have a dissolution rate at pH 4.5 of at least 20 nm per day and which has an analysis, measured as weight of oxides, which includes

| | |
|---|---|
| $SiO_2$ | 32 to 48% |
| $Al_2O_3$ | 10 to 30% |
| CaO | 10 to 30% |
| MgO | 2 to 20% |
| FeO | 2 to 15% |
| $Na_2O + K_2O$ | 0 to 12% |
| $TiO_2$ | 0 to 6% |
| Other Elements | 0 to 15% | and we make fibres from this composition.

It is surprisingly possible, in accordance with the invention, to provide fibres which have a good dissolution rate at pH 4.5 thereby facilitating clearance from the lungs by macrophages (thus promoting genuine biodegradability), even though the fibres can have low or moderate dissolution rate at pH 7.5. This allows maintenance of good stability under humid conditions (without loss of biodegradability). The fibres can have reasonably conventional melt characteristics such as liquidus temperature, crystallisation rate and melt viscosity. The fibres can be formed using inexpensive raw materials.

Another advantage of the fibres is that when they are exposed to humidity and condensed water, the resultant solution that is formed containing dissolution products has increased pH but the fibres may have reduced solubility at increased pH and so they may dissolve less and have increased durability.

The invention broadly includes all MMVF products made from a composition having the melt viscosity at 1,400° C. of 10–70 poise and wherein the manufacture, promotion or sale or use involves measurement of, or reference to measurement of, solubility at about pH 4.5 (e.g., 4 to 5) and/or in the environment of macrophages in the lung irrespective of whether the dissolution rate is measured during the actual production of such products. The fibres preferably have an analysis as stated above.

The invention includes the use of the stated composition to promote the removal of MMVF fibres from human lungs. The invention also includes the use of the stated fibres to impart the ability to be rejected from human lungs.

The invention includes MMVF products, including MMV fibres, made from a composition which has been selected in order to provide the stated solubility. For instance, it includes the measurement of pH 4–5 solubility and the melt viscosity of one or more compositions and selecting a composition partly or wholly on the basis of observing melt viscosity and solubility value at pH 4–5, and utilising compositions having the same or substantially the same analysis for making MMVF products. Any deviations in the analysis must be sufficiently small that they do not significantly alter the pH 4–5 solubility. When conducting the measurements to allow a selection of fibres to be made, the solubility can be determined at any pH (usually in the range 4–5) which correlates to the pH at 4.5. The melt viscosity can be determined either by deduction from data or by measurement and/or calculation, for any temperature (usually in the range 1,370–1,450° C.) which gives a value which correlates with the value at 1,400° C.

The selection of the composition does not have to be conducted at the same location or at about the same time as carrying out the commercial production using the selected composition. Thus a manufacturer may conduct tests, or sponsor others to conducts tests, to determine solubility and use the information from these tests as part of the basis for selecting the composition which is used for making the fibres commercially.

The invention includes products having the quoted analysis and are formed from a composition having the quoted melt viscosity and which are labelled or sold as having the defined dissolution rate at pH 4–5. The invention includes packages which contain MMV fibres and which carry a label or insert, or which are sold with advertising, which refers to solubility at pH in the range 4–5 or in the environment of macrophages or which refers to a test method which measures such solubility.

The invention includes novel MVVF products. These include horticultural MMVF growth media and fibre reinforcement wherein the fibres are as defined in the invention.

One class of fibres which are novel are fibres having the solubility, melt viscosity and composition analysis given above except that the amount of $Al_2O_3$ is at least 18%. Other useful fibres have $Al_2O_3$ above 16%. Often it is above 19 or 20%, for instance up to 26 or 28%. In fibres having $Al_2O_3$ above 16% the combined amount of alkali ($Na_2O+K_2O$) is usually at least 1% and preferably at least 2%, up to 7% or 10% or more. The amount of alkali is usually below 5% and preferably below 3% when the amount of $Al_2O_3$ is above 16%. These fibres can have good fire resistance and other mechanical properties. When these properties are of less importance, fibres having useful pH 4.5 solubility can be obtained with amounts of $Al_2O_3$ below 16% and amounts of $Na_2O+K_2O$ above 6 or 7%, for instance 8 to 12%, usually 8–10%.

Another class of fibres which are novel are fibres which preferably have the solubility and melt viscosity given above and which have the general analysis given above except that the alkali ($Na_2O+K_2O$) is above 6% and the amount of $Al_2O_3$ is usually 12–18%, and is often not more than 16% preferably 13–16%. Often the composition contains 0.5–4% $TiO_2$, usually 1–2% TiO2. The alkali is usually provided by at least 5% and often at least 7%, $Na_2O$. The total amount of alkali ($Na_2O+K_2O$) is preferably 8–12%, often 8–10%.

It is possible to select elemental analyses within the general ranges given above so as to obtain the defined combination of melt viscosity and dissolution rate at pH 4.5. Also, it is easily possible to select the composition such that the composition and the fibres comply with other desirable properties, such as liquidus temperature and sintering temperature.

For instance, if it is found that the viscosity at 1400° C. of any particular melt is too high, it may be possible to reduce it by reducing the total amount of $SiO_2+Al_2O_3$. similarly, if the melt viscosity is too low, it may be possible to increase it by raising the total amount of $SiO_2+Al_2O_3$, generally within the range of 55 to 75%, often 60 to 75%, or by increasing the amount of alkali oxide. Similarly, it may be possible to decrease the viscosity by increasing the total amount of alkaline earth metal oxide components and FeO.

If the rate of dissolution at pH 4.5 is too low, it may be possible to increase it by decreasing the amount of $SiO_2$, but it may then be necessary to increase the amount of $Al_2O_3$ (and/or to add a component such as $P_2O_5$) in order to maintain melt properties.

The amount of $SiO_2$ is normally at least 32%, often at least 34% and preferably at least 35%. It is normally below 47% and preferably below 45% and is often 38–42%. However, amounts of 42 to 47% are preferred when the amount of $Al_2O_3$ is not more than 16%.

The amount of $Al_2O_3$ is normally at least 12% and preferably at least 13%. When the amount of alkali is relatively low, good solubility at pH 4.5 can be obtained with $Al_2O_3$ amounts above 16 or 17%, especially at least 18%, but preferably at least 20% and often at least 24%. It is normally below 28% and preferably below 26%. Amounts of 20–23% are often preferred. However when the amount of alkali is relatively high (for instance at least 7% $Na_2O+K_2O$), good solubility at pH 4.5 can be obtained with $Al_2O_3$ amounts below 16%, eg 13–15%.

The combined amount of $SiO_2+Al_2O_3$ is normally 55 to 75%, usually at least 56% and preferably at least 57%. In preferred products it is often above 60%, most preferably at least 61 or 62%. It is normally below 70% or 68% and preferably below 65%. When the amount of $Al_2O_3$ is not more than 16%, the amount of $SiO_2+Al_2O_3$ is often 56–60%.

The amount of CaO is normally at least 14% and preferably at least 18%. It is normally below 28% and preferably below 25%. Amounts of 14–20% are often preferred.

The amount of MgO is normally at least 5%, preferably at least 6% and most preferably at least 8%. It is normally below 15%, preferably below 11%. When the amount of $Al_2O_3$ is not more than 16%, the amount is preferably 5–11%.

The amount of FeO is normally at least 3% and preferably at least 5%. It is normally below 12%, preferably below 10% and most preferably below 8%. Amounts of 5–7% are often preferred. Preferably CaO+MgO+FeO is 25 to 40%.

The composition often includes $TiO_2$ in an amount of up to 3% or 4%, usually up to 2%. The amount of $TiO_2$ is usually at least 0.2%, often at least 0.5 or 1%.

A variety of other elements can be present in the composition in any amount that does not detract from the desired properties Examples of other elements that can be included are $P_2O_5$, $B_2O_3$, BaO, $ZrO_2$, MnO, ZnO and $V_2O_5$.

It is often desirable to include $P_2O_5$ and/or $B_2O_3$ for instance to adjust melt properties or to adjust solubility. The total amount of $P_2O_5$ and $B_2O_3$ is generally not more than 10%. The amount of $P_2O_5$ is usually more than the amount of $B_2O_3$ and is usually at least 1% or 2%. Often $B_2O_3$ is absent. Preferably there is 1 to 8%, usually 1 to 5%, $P_2O_5$ and 0 to 5% $B_2O_3$ (often 1 to 4% $B_2O_3$).

The total amount of these various other elements is usually below 15% and often below 10% or 8%. Each of the other elements which is present is normally present in an amount of not more than 2%, except than $P_2O_3$ and/or $B_2O_3$ may be present in larger amounts as mentioned above.

The melt can have normal crystallisation characteristics, but when it is desired to minimise crystallisation this can be achieved by including magnesium in a rather low amount of for instance 2 to 6% MgO.

When it is desired to provide fibres having improved fire resistance, it is generally desired to increase the amount of FeO, which preferably is then at least 6%, for instance up to 8% or higher, for instance 10%, and the MgO should then be at least 8%.

The analysis of the composition is preferably such that the fibres have a dissolution rate at pH 4.5 of at least 25, and preferably at least 40, nm per day. It is desirable for the dissolution rate to be as high as possible (consistent with retention of adequate humidity and heat resistance properties) but it is generally unnecessary for it to be above 150 or 100 nm per day and it is usually below 80 nm per day;

Although a high dissolution rate at pH 7.5 has been proposed as a desirable property (as an indication of alleged biodegradability), in fact it is often an undesirable property since it is an indication of poor weathering resistance when exposed to humidity. Dissolution in the lungs at pH 7.5 is not exclusively necessary for the fibres to be biodegradable. Preferably, the fibres have a dissolution rate in Gambles solution at pH 7.5 of below 25, and most preferably below 15, nm per day.

The viscosity of the composition at 1400° C. is usually at least 12 or 15 poise and is preferably at least 18 poise. Although it can be as high as, for instance, 60 poise, it is generally below 40 poise and preferably it is not more than 30 poise.

When it is desired that the fibres should have good fire resistance, the analysis is preferably such that the sintering temperature is at least 800° C. and preferably at least 1,000° C.

The liquidus temperature is usually at least 1200° C. but often at least 1240° C. It can be as high as, for instance, 1400° C. but preferably it is not more than 1340° C.

An advantage of the use of the moderate aluminium melts defined for use in the invention is that it permits the inclusion in the composition of readily available materials having a moderate aluminium content such as rock, sand and waste. This therefore minimises the need to use expensive, high alumina materials such as bauxite or kaolin, and minimises at the same time the need to use expensive very low alumina materials such as silica sand or olivine sand, iron ore, etc. These more expensive materials may however be useful if desired. Typical, readily available, medium alumina materials that may be used as part or all of the composition include anorthosite and phonolite and gabbros.

The composition is typically formed by blending appropriate amounts of naturally occurring rock and sand materials such as anorthosite, gabbros, limestone, dolomite, diabase, apatite, boron-containing materials, and waste materials such as mineral wool waste, alumina silicates, slag, in particular high alumina (20–30%) slags such as ladle slag, foundry sand, filter dust, fly ash, bottom ash and high alumina waste from the production of refractory materials.

The composition can be converted to a melt in conventional manner, for instance in a gas heated furnace or in an electric furnace or in a cupola furnace. An advantage of the invention is that the composition can easily have a reasonably low liquidus temperature (while maintaining adequate viscosity at 1400° C.) and this minimises the amount of energy that is required for forming the melt.

The melt can be converted to fibres in conventional manner, for instance by a spinning cup process or by a cascade rotor process, for instance as described in WO92/06047.

The fibres of the invention can have any convenient fibre diameter and length.

In this invention, dissolution rate is determined using the following test protocol.

300 mg of fibres are placed in polyethylene bottles containing 500 ml of a modified Gamble's solution (i.e., with complexing agents), adjusted to pH 7.5 or 4.5, respectively. Once a day, the pH is checked and if necessary adjusted by means of HCl.

The tests are carried out during a one week period. The bottles are kept in a water bath at 37° C. and shaken vigorously twice a day. Aliquots of the solution are taken out after one and four days and analysed for Si on a Perkin-Elmer Atomic Absorption Spectrophotometer.

The modified Gamble's solution has the following composition:

|  | g/l |
| --- | --- |
| $MgCl_2.6H_2O$ | 0.212 |
| NaCl | 7.120 |
| $CaCl_2.2H_2O$ | 0.029 |
| $Na_2SO_4$ | 0.079 |
| $Na_2HPO_4$ | 0.148 |
| $NaHCO_3$ | 1.950 |
| $(Na_2$-tartrate$).2H_2O$ | 0.180 |
| $(Na_3$-citrate$).2H_2O$ | 0.152 |
| 90% lactic acid | 0.156 |
| Glycine | 0.118 |
| Na-pyruvate | 0.172 |
| Formalin | 1 ml |

The fibre diameter distribution is determined for each sample by measuring the diameter of at least 200 individual fibres by means of the intercept method and a scanning electron microscope or optical microscope (1000× magnification). The readings are used for calculating the specific surface of the fibre samples, taking into account the density of the fibres.

Based on the dissolution of $SiO_2$ (network dissolution), the specific thickness dissolved was calculated and the rate of dissolution established (nm/day). The calculations are based on the SiO$_2$ content in the fibres, the specific surface and the dissolved amount of Si.

| Fibre Types | SiO$_2$ % | Al$_2$O$_3$ % | TiO$_2$ % | FeO % | CaO % | MgO % | Na$_2$O % | K$_2$O % | SUM | Vis. poise 1400° C. | Diss. rate pH 7.5 (st) nm/day | Diss. rate pH 4.5 (st) nm/day | Sintering temp ° C. |
|---|---|---|---|---|---|---|---|---|---|---|---|---|---|
| A | 34.5 | 28.0 | 1.8 | 3.3 | 25.4 | 5.6 | 0.6 | 0.8 | 100.0 | 21.2 | 9.5 | 34.8 | >800 |
| B | 36.2 | 26.3 | 1.9 | 4.9 | 17.7 | 10.8 | 1.0 | 1.1 | 100.0 | 19.4 | 6.8 | 45.1 | >800 |
| C | 38.3 | 25.0 | 1.7 | 3.0 | 24.9 | 5.6 | 0.7 | 0.8 | 100.0 | 24.7 | 7.4 | 53.8 | >800 |
| D | 38.1 | 24.7 | 1.8 | 4.6 | 17.4 | 11.3 | 1.2 | 0.8 | 100.0 | 20.0 | 7.9 | 64.2 | >800 |
| E | 43.2 | 20.0 | 1.6 | 5.0 | 16.6 | 11.5 | 1.2 | 0.8 | 100.0 | 22.8 | 5.0 | 57.9 | >800 |
| F | 43.2 | 19.8 | 1.5 | 3.4 | 24.7 | 5.6 | 1.0 | 0.8 | 100.0 | 27.1 | 4.8 | 47.0 | >800 |
| G | 47.7 | 19.4 | 0.8 | 3.7 | 16.6 | 10.8 | 0.4 | 0.4 | 100.0 | 34.7 | 3.0 | 21.0 | >800 |
| H | 43.7 | 18.8 | 3.6 | 5.4 | 16.4 | 9.7 | 1.8 | 0.7 | 100.0 | 25.1 | 5.8 | 38.6 | >800 |
| I | 45.6 | 18.1 | 1.5 | 5.3 | 16.5 | 9.7 | 2.5 | 0.7 | 100.0 | 30.8 | 3.1 | 44.4 | >800 |
| J | 46.9 | 18.9 | 0.5 | 3.3 | 17.0 | 9.5 | 3.4 | 0.5 | 100.0 | 44.0 | 0.9 | 35.2 | >800 |
| K | 44.1 | 18.7 | 1.6 | 5.2 | 16.5 | 9.8 | 3.3 | 0.7 | 100.0 | 30.3 | 2.6 | 41.1 | >800 |
| L | 39.6 | 24.3 | 1.8 | 3.2 | 21.7 | 6.7 | 1.8 | 0.8 | 100.0 | 30.8 | 5.7 | 49 | >800 |
| M | 43.8 | 20.4 | 1.2 | 10.3 | 15.6 | 8.3 | 0.2 | 0.3 | 100.0 | 21.9 | 3.9 | 39.7 | >1000 |
| N | 42.9 | 23.2 | 0.7 | 8.8 | 17.5 | 5.1 | 0.6 | 1.4 | 100.0 | 36.8 | — | 45.9 | >900 |
| O | 43.1 | 19.9 | 1.6 | 10.1 | 15.0 | 9.3 | 0.6 | 0.4 | 100.0 | 19.8 | 4.6 | 51.9 | >1000 |
| P | 37.8 | 18.3 | 0.9 | 12.0 | 15.8 | 10.1 | 4.7 | 0.3 | 100.0 | 15.0 | 10.2 | 61.5 | >1000 |
| Q | 40.0 | 22.2 | 2.0 | 7.5 | 15.2 | 10.7 | 1.5 | 0.8 | 100.0 | 19.4 | 7.1 | 61.1 | >1000 |
| R | 45.4 | 14.5 | 1.6 | 5.6 | 15.3 | 7.2 | 9.0 | 0.9 | 100.0 | 39.9 | 3.1 | 48.1 | >1000 |
| S | 45.3 | 17.5 | 1.1 | 5.7 | 20.3 | 7.8 | 1.7 | 0.6 | 100.0 | 25.9 | 1.8 | 48.6 | >1000 |
| T | 43.1 | 14.0 | 0.7 | 0.5 | 34.3 | 5.2 | 0.7 | 1.5 | 100.0 | 15.2 | 1.5 | 59.8 | >700 |
| U | 37.2 | 16.1 | 1.6 | 3.3 | 21.5 | 10.1 | 9.3 | 1.0 | 100.0 | 29.2 | 5.2 | 48.0 | >800 |
| V | 42.9 | 16.6 | 1.7 | 6.4 | 16.8 | 9.6 | 5.2 | 0.8 | 100.0 | 25.3 | 3.1 | 21.9 | >1000 |
| W | 38.9 | 16.4 | 1.4 | 8.4 | 20.0 | 7.9 | 6.4 | 0.6 | 100.0 | 20.2 | 9.5 | 33.0 | >1000 |
| X | 42.5 | 16.4 | 1.7 | 5.8 | 21.1 | 6.3 | 5.4 | 0.8 | 100.0 | 27.1 | 4.1 | 32.9 | >1000 |
| 1 | 42.7 | 8.8 | 0.3 | 0.4 | 36.9 | 9.4 | 0.7 | 0.3 | 100.0 | 8.2 | 13.9 | 41.1 | >700 |
| 2 | 39.7 | 32.8 | 1.7 | 7.0 | 15.7 | 2.1 | 0.3 | 0.7 | 100.0 | 100.0 | 7.8 | 59.3 | >1000 |
| 3 | 46.9 | 13.2 | 3.0 | 6.4 | 17.1 | 9.4 | 2.6 | 1.3 | 100.0 | 23.7 | 2.0 | 3.0 | >1000 |

In this specification, the sintering temperature is determined by the following test protocol.

A sample (5×5×7.5 cm) of mineral wool made of the fibre composition to be tested is placed in a furnace pre-heated to 700° C. After 1.5 hours exposure the shrinkage and the sintering of the sample were evaluated. The method is repeated each time with a fresh sample and a furnace temperature 50° C. above the previous furnace temperature until the maximum furnace temperature, at which no sintering or no excessive shrinkage of the sample is observed, was determined.

In this specification, the viscosity in poise at 1400° C. is calculated according to Bottinga and Weill, American Journal of Science Volume 272, May 1972, page 455–475.

The following are examples of the invention.

Compositions were formed by blending appropriate proportions of raw materials as shown in the table and each was melted in a crucible furnace and was fiberised by the cascade spinner technique. The melt viscosity and solubility of each was determined. The analyses of the compositions and their properties are quoted in the following tables. In the invention, any of compositions A to X are judged to be suitable and are selected for the subsequent manufacture of MMVF products which are labelled as having good biological solubility. Those having viscosity above 20 and pH 4.5 solubility above 30 are preferred.

Product 1 is similar to commercial slag wool and gives a poor viscosity. Product 2 is a high aluminium product but the proportions of all the components are such that the melt viscosity is too high for convenient spinning. Product 3 is similar to a conventional rock wool product with normal good product properties but has a very low dissolution rate at pH 4.5. Accordingly products 1, 2 and 3 are not selected for use in the manufacture of biologically soluble MMV fibre products.

The selected fibres may be provided in any of the forms conventional for MMV fibres. Thus they may be provided as a product consisting of loose, unbonded fibres. More usually, they are provided with a bonding agent, for instance as a result of forming the fibres and connecting them in conventional manner. Generally the product is consolidated as a slab, sheet or other shaped article.

Products according to the invention may be formulated for any of the conventional purposes of MMV fibres, for instance as slabs, sheets, tubes or other shaped products that are to serve as thermal insulation, fire insulation and protection or noise reduction and regulation, or in appropriate shapes for use as horticultural growing media, or as free fibres for reinforcement of cement, plastics or other products or as a filler.

What is claimed is:

1. A method of making man-made vitreous fibre product comprising selecting a mineral melt composition which has a viscosity at 1400° C. of 10 to 70 poise at a pH in the range 4–5 and provides fibres which have a dissolution rate of at least 20 nm per day when measured at a pH of 4.5 and a sintering temperature of at least 800° C. and which includes, by weight of oxides,

| | |
|---|---|
| SiO$_2$ | 32 to 48% |
| Al$_2$O$_3$ | 12 to 30% |
| CaO | 10 to 28% |
| MgO | 2 to 20% |
| FeO | 2 to 15% |
| Na$_2$O + K$_2$O | 0 to 12% |
| TiO$_2$ | 0 to 4% |
| Other Elements | 0 to 8% | and forming the man-made vitreous fibres from the selected composition.

2. The method according to claim 1 in which the amount of $Al_2O_3$ is above 16% up to 28%, the amount of MgO is at least 5% up to 20%, and the amount of iron, measured as FeO, is up to 10%.

3. The method of claim 2 in which the amount of iron, measured as FeO, is at least 5% but below 10%.

4. The method according to claim 2 in which the composition has a viscosity of at least 12 poise at 1400° C. and the fibres have a dissolution rate at pH 7.5 below 15 nm per day.

5. The method according to claim 1 in which the composition has a viscosity of 15 to 40 poise at 1400° C. and the fibres have a sintering temperature of a t least 1000° C.

6. The method according to claim 1 in which $Al_2O_3$ is 18–30%, $SiO_2+Al_2O_3$ is 60–75%, FeO is 2–12%, $Na_2O+K_2O$ is 0–7%, $TiO_2$ is 0–4% and other elements is 0–8%.

7. The method according to claim 2 in which the composition has a liquidus temperature of 1240° C. to 1340° C.

8. The method of claim 2 in which the amount of $Al_2O_3$ is at least 18%.

9. Vitreous fibres which are biologically acceptable, utilizing fibres of a composition which includes, by weight of oxides,

| | |
|---|---|
| $SiO_2$ | 32 to 48% |
| $Al_2O_3$ | 12 to 30% |
| CaO | 10 to 28% |
| MgO | 2 to 20% |
| FeO | 2 to 15% |
| $Na_2O + K_2O$ | 0 to 12% |
| $TiO_2$ | 0 to 4% |
| Other Elements | 0 to 8% | said composition has a viscosity at 1400° C. of 10 to 70 poise at a pH in the range 4–5, a dissolution rate of at least 20 nm per day when measured at a pH of 4.5 and a sintering temperature of at least 800° C.

10. The fibres according to claim 9 in which the amount of $Al_2O_3$ is above 16% up to 28%, the amount of MgO is at least 5% up to 20%, and the amount of iron, measured as FeO, is up to 10%.

11. The fibres of claim 10 in which the amount of iron, measured as FeO, is at least 5% but below 10%.

12. The fibres according to claim 9 in which the composition has a viscosity of at least 12 poise at 1400° C. and the fibres have a dissolution rate at pH 7.5 below 15 nm per day.

13. The fibres according to claim 12 in which the composition has a viscosity of 15 to 40 poise at 1400° C. and the fibres have a sintering temperature of at least 1000° C.

14. The fibres according to claim 9 in which $Al_2O_3$ is 18–30%, $SiO_2+Al_2O_3$ is 60–75%, FeO is 2–12%, $Na_2O+K_2O$ is 0–7%, $TiO_2$ is 0–4% and other elements is 0–8%.

15. The fibres according to claim 9 in which the composition has a liquidus temperature of 1240° C. to 1340° C.

16. The fibres of claim 9 in which the amount of $Al_2O_3$ is at least 18%.

17. A product comprising man-made vitreous fibres formed of a composition having an analysis, as oxides, which includes:

| | |
|---|---|
| $SiO_2$ | 32 to 48% |
| $Al_2O_3$ | 12 to 30% |
| CaO | 10 to 28% |
| MgO | 2 to 20% |
| FeO | 2 to 20% |
| $Na_2O + K_2O$ | 6 to 12% |
| $TiO_2$ | 0 to 4% |
| Other Elements | 0 to 8% | said composition has a viscosity at 1400° C. of 10 to 70 poise, wherein the fibres have (a) a dissolution rate at pH 4.5 of at least 20 nm per day and (b) a sintering temperature of at least 800° C.

18. A product according to claim 17 in which the amount of MgO is at least 5% up to 20%.

19. A product according to claim 17 in which the amount of iron measured as FeO is 5% to below 10%.

20. A product according to claim 17 in which the amount of $SiO_2$ is 32 to 45%.

21. A product according to claim 17 in which the amount of $Na_2O +K_2O$ is 6 to 10%.

22. The method of claim 1 wherein the step of selecting a mineral melt composition comprises forming one or more mineral melts having said oxide composition and determining the viscosity, dissolution rate and sintering temperature associated therewith.

23. The fibres of claim 16 in which the amount of silica is up to 42%.

24. The method of claim 4 in which the amount of silica is up to 42%.

* * * * *